United States Patent [19]
Takahashi et al.

[11] Patent Number: 5,369,664
[45] Date of Patent: Nov. 29, 1994

[54] MOBILE COMMUNICATION SYSTEM

[75] Inventors: Kenichi Takahashi, Kawasaki; Hiroshi Ohnishi, Tokyo; Minako Takeishi, Kawasaki, all of Japan

[73] Assignee: Matsushita Electric Industrial Co., Ltd., Japan

[21] Appl. No.: 16,219

[22] Filed: Feb. 11, 1993

[30] Foreign Application Priority Data

Aug. 12, 1991 [JP] Japan .................................. 3-201689

[51] Int. Cl.⁵ .......................... H04J 3/16; H04B 7/216
[52] U.S. Cl. .................................. 375/1; 370/79; 370/95.3
[58] Field of Search .............. 375/1; 370/79, 95.3; 455/56.1

[56] References Cited

U.S. PATENT DOCUMENTS 4,549,303 10/1985 Gutleber .................................. 375/1
5,193,101 3/1993 McDonald et al. .................. 375/1

FOREIGN PATENT DOCUMENTS 63-70631 3/1988 Japan .

*Primary Examiner*—Gilberto BarrACE/o/ n, Jr.
*Attorney, Agent, or Firm*—Parkhurst, Wendel & Rossi

[57] ABSTRACT

Each of groups each has a plurality of communication channels. There are generated signals to be transmitted via the respective communication channels in the groups. The transmitted signals are time-division-multiplexed into a data sequence for each of the groups. The data sequences are spectrum-spread in response to different spread code patterns respectively. A reserve time slot may be provided. In cases where a reduction of a received signal quality related to one of the communication channels is detected, the reserve time slot is used in transmitting the signal of said one of the communication channels.

2 Claims, 5 Drawing Sheets

| CODE \ TIME SLOT | $T_1$ | $T_2$ | $T_3$ | $T_4$ | $T_5$ |
|---|---|---|---|---|---|
| $C_1$ | #1 | #2 | #3 | #4 | #3 |
| $C_2$ | #5 | #6 | #7 | #8 | — |
| $C_3$ | #9 | #10 | #11 | #12 | — |
| $C_4$ | #13 | #14 | #15 | #16 | — |
| $C_5$ | #17 | #18 | #19 | #20 | — |

FIG. 3

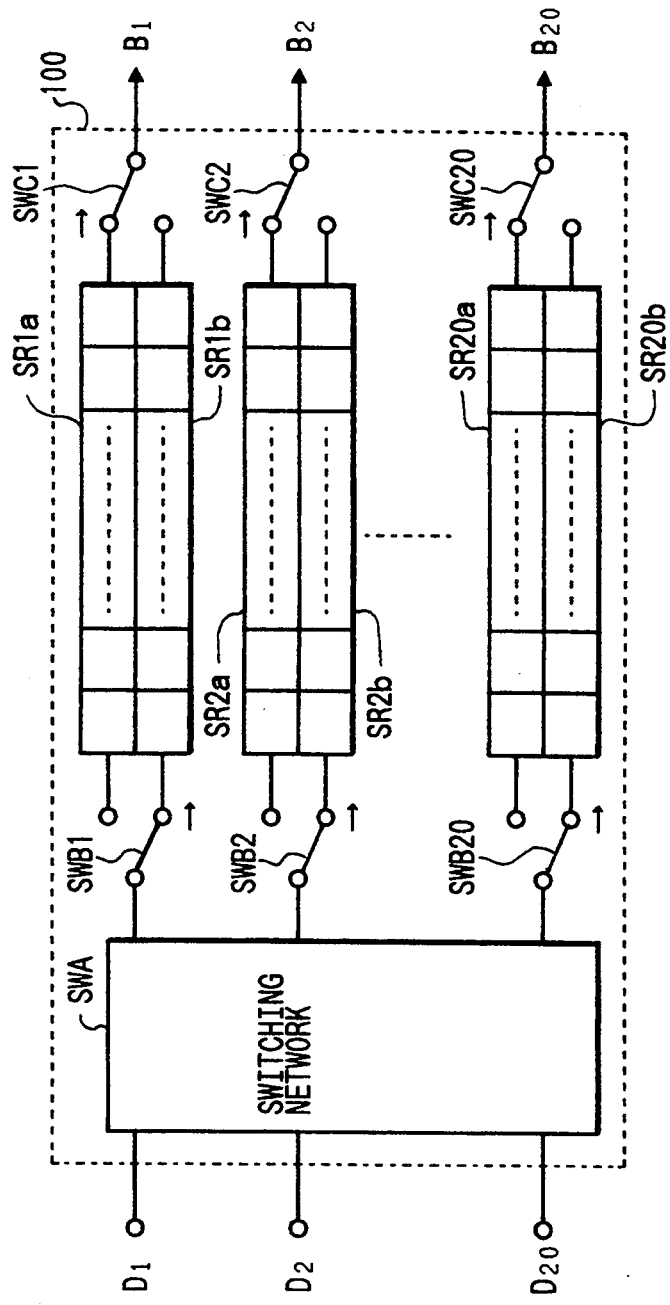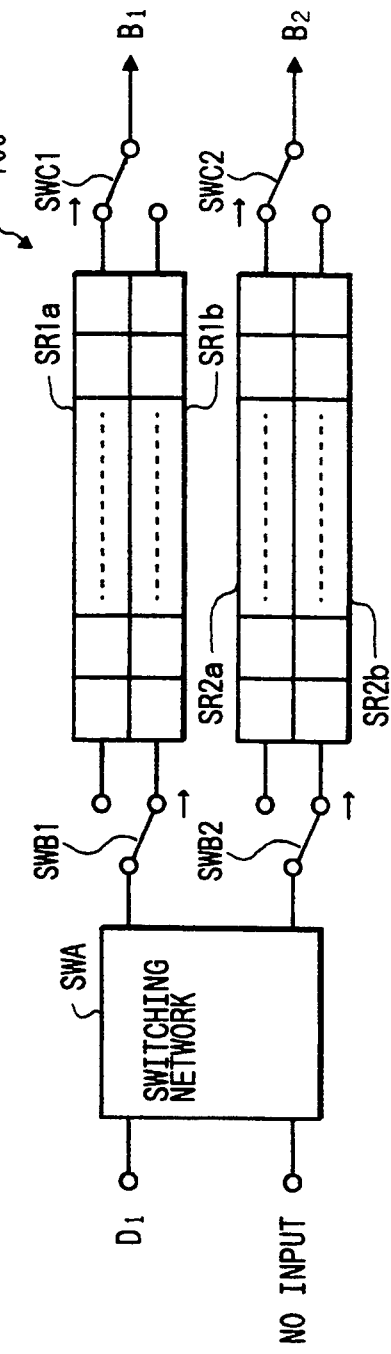
FIG. 6
FIG. 7

MOBILE COMMUNICATION SYSTEM

BACKGROUND OF THE INVENTION

1. Field of the Invention

This invention relates to a mobile communication system in which a base station and mobile stations can communicate with each other by radio.

2. Description of the Prior Art

According to the Japanese automobile telephone system using digital radio communication, digital modulation is of the π/4-shift QPSK (quadriphase shift keying) type, and a plurality of carriers are used. During the radio communication, each of the carriers is subjected to 3-channel TDM (time division multiplexing).

In Europe, a GSM (global system for mobile communications) system using digital radio communication has been studied for practical use. According to the GSM system, digital modulation is of the GMSK (Gaussian filtered minimum shift keying) type, and a plurality of carriers are used. During the radio communication, each of the carriers is subjected to 8-channel TDM.

Furthermore, in Europe, a DECT (digital European cordless telecommunications) system has been investigated for private radio data transmission and private radio speech transmission within a small zone. According to the DECT system, digital modulation is of the GMSK type, and a plurality of carriers are used. In addition, TDM/TDD (time division multiplexing/time division duplex) is used in which equal numbers (about 10 channels) of uplinks and downlinks are assigned to each of the carriers.

An investigation has also been given of other various communication systems in which a base station and terminal stations in a service area covered by the base station can execute speech or data communication with each other by radio in time division multiplexing.

Time division multiplexing is used because of its advantages over frequency division multiplexing which will be described in the following. The first advantage is that a transmission data rate is variable and thus a certain degree of the flexibility of communication channels can be provided. The second advantage is that radio communication between the base station and the terminal stations has a burst shape in time base (time axis) and hence it is possible to set an interval of time during which operation is unnecessary.

On the other hand, time division multiplexing has the following disadvantages. As the degree of multiplexing increases, a transmission frequency band required for radio communication widens so that an equivalent noise bandwidth at a receiving side increases. Consequently, with respect to equal received signal levels, a received signal quality drops. In addition, with respect to equal transmission powers, an effective service area narrows. Further, radio communication in the present service area tends to be subject to interference from terminal stations located in neighboring service areas.

The other disadvantage of time division multiplexing will be described hereinafter. With respect to maintaining the qualities of received signals in communication channels resulting from time division, communication channels of equal times, equal modulation types, and a same carrier tend to interfere with each other. In addition, the communication channels tend to be subject to interference from another narrow-band system.

To maintain an adequate quality of a received signal of each communication channel, it is necessary that the received level of a desired signal is greater than that of an interfering signal by about 10 dB or more.

Also, a CDMA (code division multiple access) system has been investigated. In the CDMA system, information bits to be transmitted are spread in spectrum so as to be multiplexed within a common carrier according to spread code patterns having ten bits to several thousands of bits. The degree of multiplexing is determined by the number of different spread code patterns.

The CDMA system has the following advantages. Communication is hardly affected by narrow-band interference, in addition, many communication channels can be provided within a common carrier.

It is generally difficult for the previously-mentioned prior art communication systems to simultaneously satisfy enabling communications with different data rates, maintaining acceptable flexibilities of communication channels, a great resistance to narrow-band interference, and permitting a common carrier to be used by many users.

The prior art spread spectrum communication system using the spread code patterns has the following problem. In the case where the received level of a signal of a desired communication channel which is spread in spectrum according to a spread code is extremely lower than the received levels of other signals spread in spectrum with other spread codes, a received signal quality of the desired communication channel tends to be lowered.

SUMMARY OF THE INVENTION

It is an object of this invention to provide an improved mobile communication system.

This invention provides a mobile communication system comprising means for providing groups each having a plurality of communication channels; means for generating signals to be transmitted via the respectivecommunication channels in the groups; means for time-division-multiplexing the transmitted signals into a data sequence for each of the groups; and means for spectrum-spreading the data sequences in response to different spread code patterns respectively.

BRIEF DESCRIPTION OF THE DRAWINGS

FIG. 3 is a diagram of the structure of radio communication channels from a base station to terminal stations in the mobile communication system according to the embodiment of this invention.

FIG. 6 is a block diagram of the burst generating circuit of FIG. 1.

FIG. 7 is a block diagram of a part of the burst generating circuit of FIG. 1.

DESCRIPTION OF THE PREFERRED EMBODIMENT

In a mobile communication system according to an embodiment of this invention, there are provided five different spread code patterns for one carrier. In addition, the number (degree) of time division multiplexing is five, and one of them is a reserve time division multiplexing slot.

Figure 1:
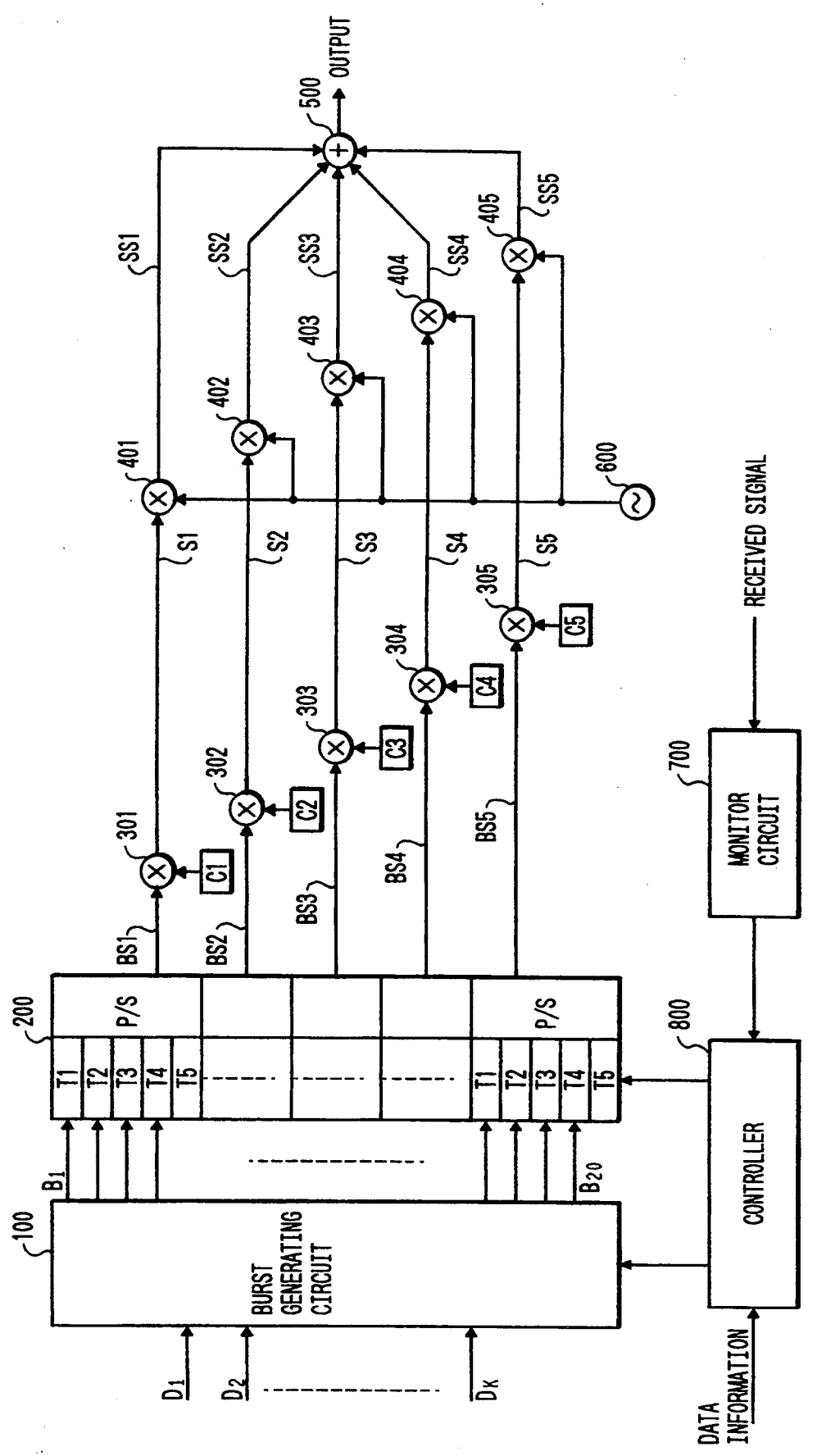
FIG. 1 is a block diagram of a transmission side of a mobile communication system according to an embodiment of this invention.

With reference to FIG. 1, a transmission side of the mobile communication system includes a burst generating circuit 100, a parallel-to-serial (P/S) converter 200, spread circuits 301-305, up mixers 401-405, an adder or a summing circuit 500, a local signal generator 600, a monitor circuit 700, and a controller 800.

The burst generating circuit 100 produces burst data B1, B2, . . . , Bl in response to a plurality of input transmission data sequences D1, D2, . . . , Dk, where "l" denotes a given natural number which is variable up to 20 and "k" denotes a given natural number which is generally variable. For example, "k" equals 20. Each of the burst data B1, B2, . . . , Bl is designed so as to correspond to one of the time slots of the system. The burst generating circuit 100 feeds the burst data B1, B2, . . . , Bl to the P/S converter 200.

The burst generating circuit 100 is controlled by the controller 800. The controller 800 includes a CPU or a signal processing device programmed so as to control the number of the burst data B1, B2, . . . , Bl produced by the burst generating circuit 100 in response to input data information.

The P/S converter 200 has five segments each including registers corresponding to time slots T1, T2, T3, T4, and T5 respectively, and a P/S converting element following the registers. The segments of the P/S converter 200 correspond to different spread code patterns C1, C2, C3, C4, and C5 respectively. The time slots T1, T2, T3, and T4 are designed for general use while the time slot T5 is designed for reserve use. In general, the burst data B1, B2, . . . , Bl are stored into the registers corresponding to the time slots T1, T2, T3, and T4 in response to time slot control information fed from the controller 800. The P/S converting elements receive parallel combinations of the burst data B1, B2, . . . , Bl from the registers, and transform the received parallel burst data into serial burst data BS1, BS2, BS3, BS4, and BS5. The P/S converter 200 feeds the serial burst data BS1, BS2, BS3, BS4, and BS5 to the spread circuits 301, 302, 303, 304, and 305 respectively.

The spread circuits 301, 302, 303, 304, and 305 receive different spread codes C1, C2, C3, C4, and C5 from spread code generators (not shown) respectively. The spread circuits 301, 302, 303, 304, and 305 combine the serial burst data BS1, BS2, BS3, BS4, and BS5 and the spread codes C1, C2, C3, C4, and C5, spreading the serial burst data BS1, BS2, BS3, BS4, and BS5 in spectrum and converting the serial burst data BS1, BS2, BS3, BS4, and BS5 into first spread spectrum signals S1, S2, S3, S4, and S5 in response to the spread codes C1, C2, C3, C4, and C5 respectively. The spread circuits 301,302, 303, 304, and 305 feed the first spread spectrum signals S1, S2, S3, S4, and S5 to the up mixers 401, 402, 403, 404, and 405 respectively.

The up mixers 401,402, 403, 404, and 405 receive an local signal from the local signal generator 600. The up mixers 401, 402, 403, 404, and 405 mix the first spread spectrum signals S1, S2, S3, S4, and S5 and the local signal, up-converting the first spread spectrum signals S1, S2, S3, S4, and S5 into a local signed frequency-band and thereby converting the first spread spectrum signals S1, S2, S3, S4, and S5 into second spread spectrum signals SS1, SS2, SS3, SS4, and SS5 in an RF band respectively. The up mixers 401, 402, 403, 404, and 405 feed the second spread spectrum signals SS1, SS2, SS3, SS4, and SS5 to the adder 500.

The adder 500 combines the second spread spectrum signals SS1, SS2, SS3, SS4, and SS5 into a composite spread spectrum signal, that is, a time-division-multiplexed spread spectrum signal, which is transmitted through a power amplifier (not shown) and an antenna (not shown).

The monitor circuit 700 analyzes received signals of the respective time slots which are fed from a reception side (not shown). The monitor circuit 700 compares the levels of the received signals of the respective time slots with a reference level, deciding whether or not receiving conditions of the respective time slots are acceptable. When the level of the received signal of one time slot is smaller than the reference level, the receiving conditions of that time slot are decided to be unacceptable. The decision of whether or not the receiving conditions of the respective time slots are acceptable may be performed also in response to error rates of the received signals of the respective time slots. In addition, the decision of whether or not the receiving conditions of the respective time slots are acceptable may be performed by comparing the levels of the received signals of the respective time slots with each other. In this case, when the level of the received signal of one time slot is significantly lower than the levels of the received signals of the other time slots, the receiving conditions of that time slot are decided to be unacceptable. In the presence of unacceptable receiving conditions of one of the time slots T1, T2, T3, and T4, the monitor circuit 700 informs the controller 800 of the occurrence of the unacceptable receiving conditions and the time slot (the unacceptable time slot) related to the unacceptable receiving conditions.

In the presence of unacceptable receiving conditions of one of the time slots T1, T2, T3, and T4, the controller 800 controls the P/S converter 200 in response to the time slot control information fed from the monitor circuit 700 so that the unacceptable time slot will be replaced by the reserve time slot T5 related to the spread code same as the spread code corresponding to the unacceptable time slot. When later communication using the reserve time slot T5 is also unacceptable, the controller 800 controls the P/S converter 200 so that the reserve time slot T5 related to another spread code will be newly used. The P/S converter 200 includes a switching network connected between the output terminals of the burst generating circuit 100 and the registers corresponding to the time slots T1, T2, T3, T4, and T5. In the presence of unacceptable receiving conditions of one of the time slots T1, T2, T3, and T4. The controller 800 controls the switching network in response to the time slot control information so that the burst generating circuit 100 will be disconnected from the registers corresponding to the unacceptable time slot but will be connected to the resisters corresponding to the reserve time slot T5.

Figures 2, 5:
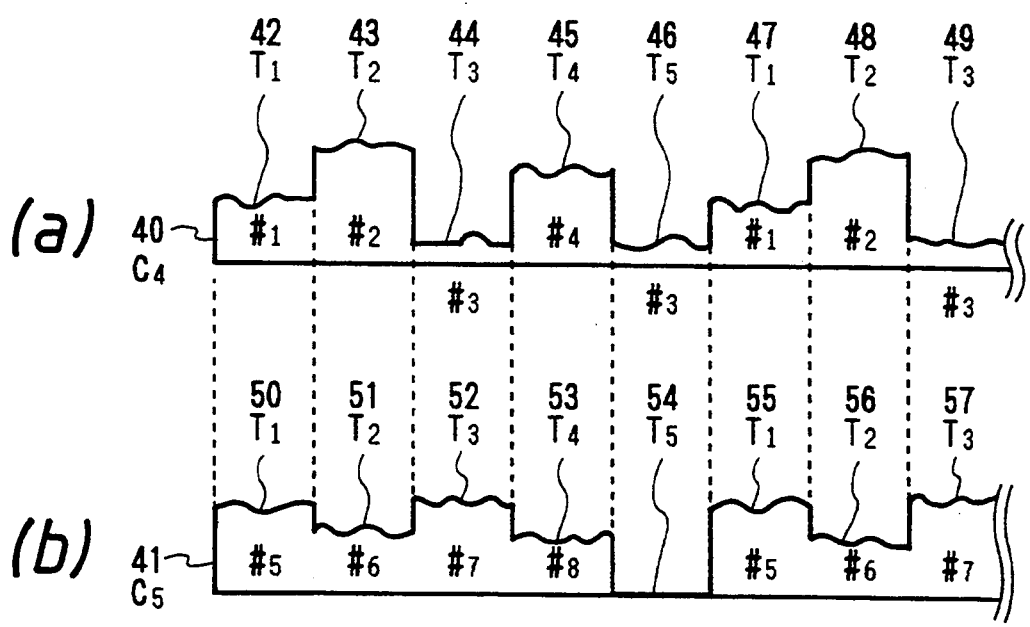
FIG. 2 is a diagram of the allocation of communication channels in the mobile communication system according to the embodiment of this invention.
FIG. 5 is a time-domain diagram of received signal levels of time slots related to two different spread code patterns in a base station.

FIG. 2 shows an example of allocation or assignment of communication channels. In FIG. 2, C1, C2, C3, C4, and C5 denote the different spread code patterns, and T1, T2, T3, T4, and T5 denote the time slots resulting from time division multiplexing. In addition, #1, #2, . .

., and #20 denote different communication channels. For example, the communication channels #1, #2, ..., and #20 are provided between a base station and mobile stations in a service area of the base station.

As shown in FIG. 2, the communication channels #1, #2, #3, and #4 are assigned to the time slots T1, T2, T3, and T4 respectively, and signals in the communication channels #1, #2, #3, and #4 are subjected to the spread spectrum processes responsive to the spread code pattern C1. The communication channels #5, #6, #7, and #8 are assigned to the time slots T1, T2, T3, and T4 respectively, and signals in the communication channels #5, #6, #7, and #8 are subjected to the spread spectrum processes responsive to the spread code pattern C2. The communication channels #9, #10, #11, and #12 are assigned to the time slots T1, T2, T3, and T4 respectively, and signals in the communication channels #9. #10, #11, and #12 are subjected to the spread spectrum processes responsive to the spread code pattern C3. The communication channels #13, #14, #15, and #16 are assigned to the time slots T1, T2, T3, and T4 respectively, and signals in the communication channels #13, #14, #15, and #16 are subjected to the spread spectrum processes responsive to the spread code pattern C4. The communication channels #17, #18, #19, and #20 are assigned to the time slots T1, T2, T3, and T4 respectively, and signals in the communication channels #17, #18, #19, and #20 are subjected to the spread spectrum processes responsive to the spread code pattern C5.

In the case where receiving conditions of the communication channel #3 using the time slot T3 are decided to be unacceptable, the reserve time slot T5 corresponding to the spread code pattern C1 is used instead of the time slot T3 to maintain the communication channel #3.

Figure 3:
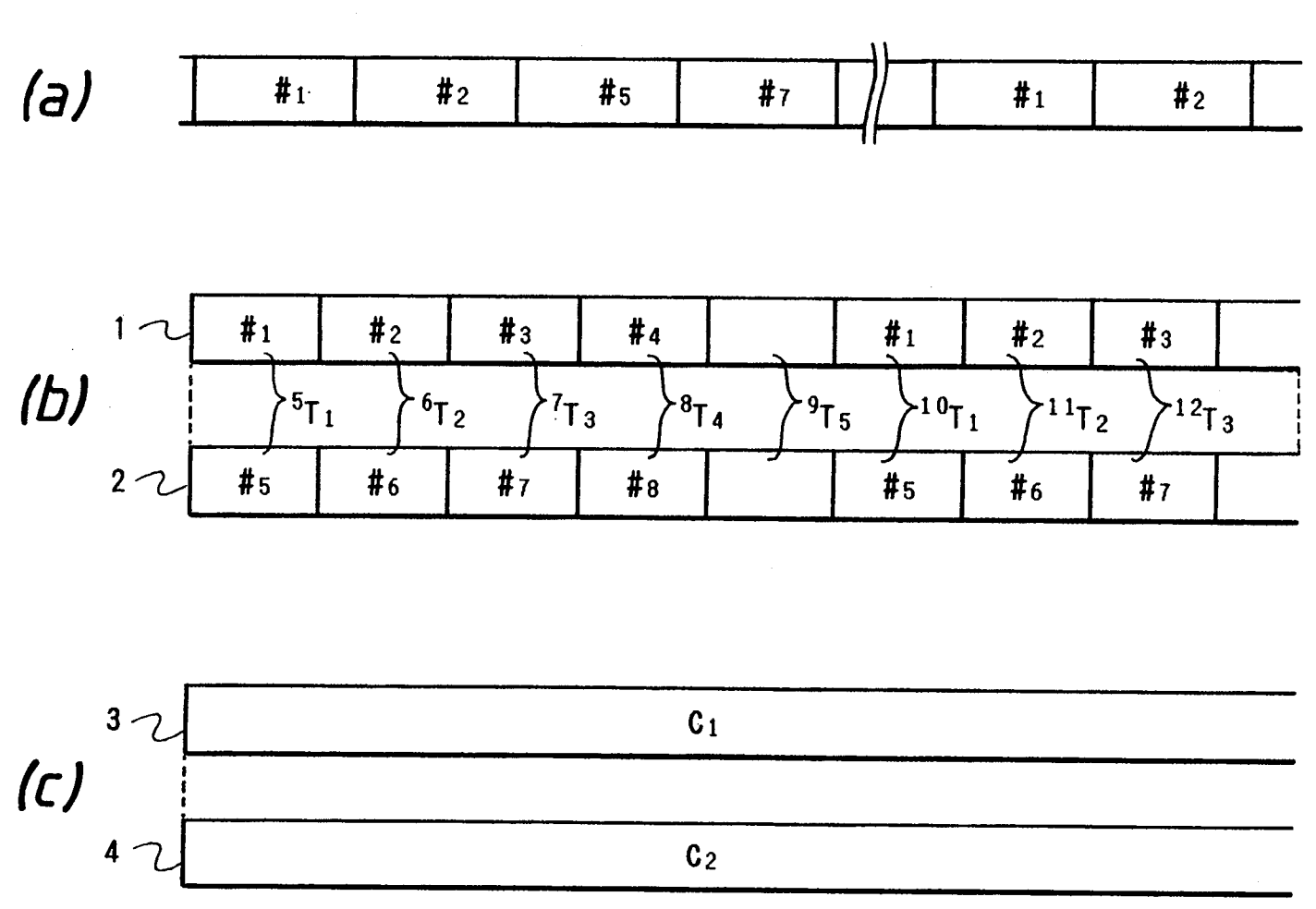

FIG. 3 shows the details of examples of allocation or assignment of communication channels. Specifically, the section (a) of FIG. 3 shows time-division-multiplexed channels of transmission from a base stations to mobile stations, and #1, #2, ..., and #7 denote transmission channel data to the mobile stations respectively.

The section (b) of FIG. 3 shows conditions of time division multiplexing in radio communication lines (paths) for the spread code patterns C1 and C2. In the section (b) of FIG. 3, the numeral 1 and the numeral 2 denote sequences of time slots 5, 6. 7, 8, 9, 10, 11, 12, ... In the sequence 1, the communication channels #1, #2, #3, and #4 are assigned to the time slots 5, 6, 7, and 8, that is, T1, T2, T3, and T4, respectively, similar to the case of FIG. 2. Also, the communication channels #1, #2, #3, and #4 are assigned to the later time slots 10, 11, 12, and 13, that is, T1, T2, T3, and T4, respectively. In the sequence 2, the communication channels #5, #6, #7, and #8 are assigned to the time slots 5, 6, 7, and 8, that is, T1, T2, T3, and T4, respectively, similar to the case of FIG. 2. Also, the communication channels #5, #6, #7, and #8 are assigned to the later time slots 10, 11, 12, and 13, that is, T1, T2, T3, and T4, respectively. During the reserve time slot 9, that is, T5, the transmission of radio wave is generally absent.

As indicated by the numerals 3 and 4 in the section (c) of FIG. 3, the sequences 1 and 2 are subjected to the spread spectrum processes in response to the spread code patterns C1 and C2 respectively.

Figure 4:
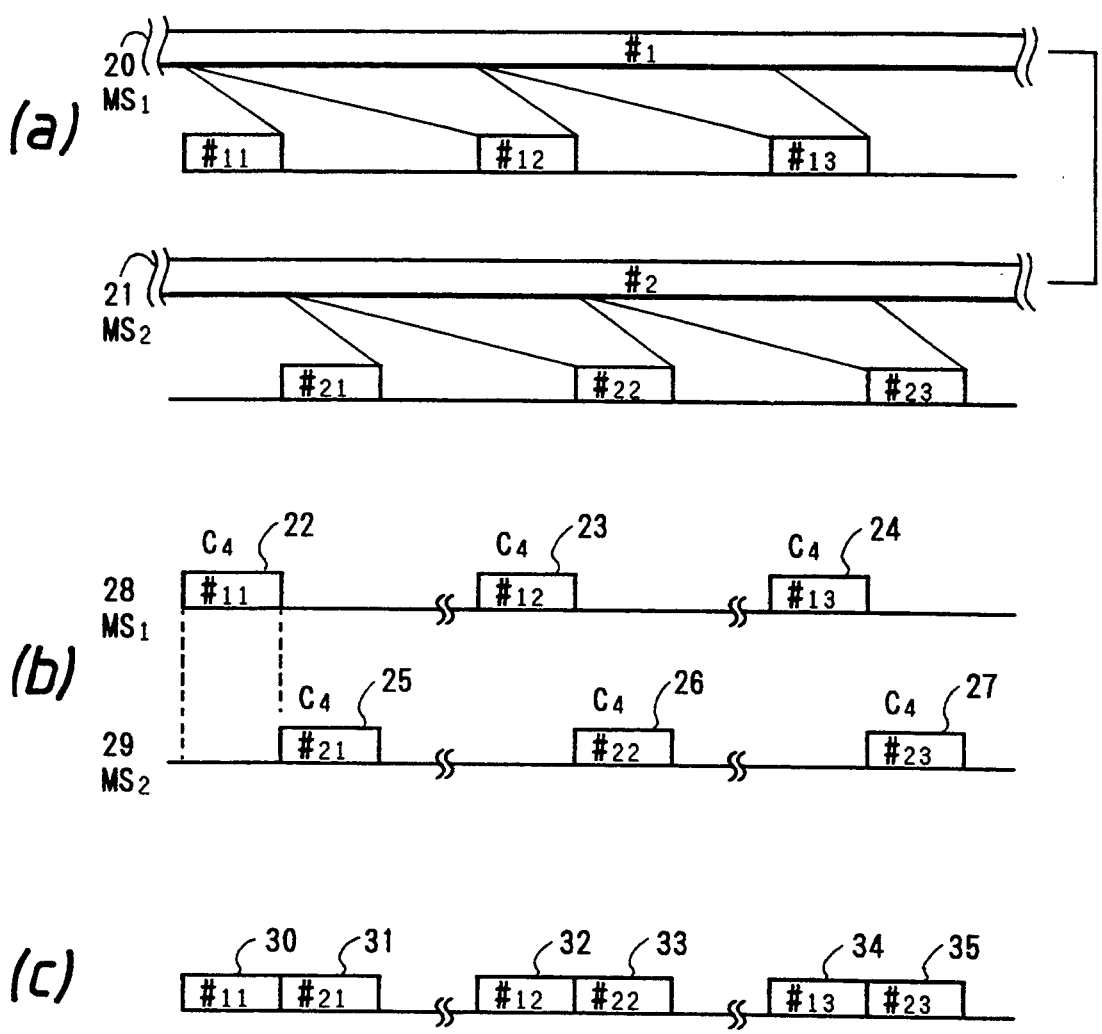
FIG. 4 is a diagram of the structure of radio communication channels from terminal stations to a base station in the mobile communication system according to the embodiment of this invention.

FIG. 4 shows conditions where two mobile stations MS1 and MS2 in a service area transmit data to a base station by radio using equal spread code patterns C4. Specifically, the section (a) of FIG. 4 shows conditions where a data sequence 20 of communication channel data #1 in the mobile station MS1 is separated into time-division-multiplexing burst data #11, #12, and #13, and a data sequence 21 of communication channel data #2 in the mobile station MS2 is separated into time-division-multiplexing burst data #21, #22, and #23.

The section (b) of FIG. 4 shows radio data sequences 28 and 29 transmitted from the mobile stations MS1 and MS2 to the base station respectively. The radio data sequence 28 has data blocks 22. 23, and 24 which result from subjecting the time-division-multiplexing burst data #11, #12, and #13 in the mobile station MS1 to the spread spectrum processes responsive to the spread code C4. The radio data sequence 29 has data blocks 25, 26, and 27 which result from subjecting the time-division-multiplexing burst data #21, #22, and #23 in the mobile station MS2 to the spread spectrum processes responsive to the spread code C4.

The section (c) of FIG. 4 shows conditions of the reception of spread spectrum modulated waves at the base station which are transmitted from the mobile stations MS1 and MS2. As shown in the section (c) of FIG. 4, during reception time slots 30, 32, and 34, the radio data #11, #12, and #13 are received from the mobile station MS1. In addition, during reception time slots 31, 33, and 35, the radio data #21, #22, and #23 are received from the mobile station MS2.

In the above-mentioned arrangement, a number of communication channels which equals the maximum number of time division multiplexing can be provided for each spread code pattern. Since the respective communication channels are time-division-multiplexed, communication channels having a higher data rate can be provided between specified mobile stations and a base station by using a plurality of time slots.

FIG. 5 shows an example of conditions of the levels of received spread spectrum modulated waves in a base station which are transmitted from eight mobile stations while two different spread code patterns are used. In FIG. 5, the numeral 40 denotes a sequence of the spread spectrum signals of the communication channels #1, #2, #3, and #4 which result from the spread spectrum processes responsive to the spread code pattern C4 and which vary in level as shown at 42, 43, 44, 45, 46, 47, 48, and 49. In addition, the numeral 41 denotes a sequence of the spread spectrum signals of the communication channels #5, #6, #7, and #8 which result from the spread spectrum processes responsive to the spread code pattern C5 and which vary in level as shown at 50, 51, 52, 53, 55, 56, and 57.

Under the conditions shown in FIG. 5, during the signal reception at the base station, the levels of the received signals of the communication channels #3 and #7 of the same time slot T3 are significantly different from each other. Specifically, the level of the received signal of the communication channel #3 is much smaller than the level of the received signal of the communication channel #7. In this case, the quality of the received signal of the communication channel #3 tends to be much reduced by the received signal of the communication channel #7 although the received signals relate to the different spread codes C4 and C5. The base station detects the reduction of the quality of the received signal of the communication channel #3 in response to, for example, the small level thereof, and instructs the mobile station, corresponding to the unacceptable communication channel #3, to use the reserve time slot T5 instead of the time slot T3 for signal transmission. Thus, the mobile station transmits the later signal of the communication channel #3 by using the time slot T5.

In this way, a reduction of the received signal quality is prevented when the level of a spread spectrum signal of a desired communication channel related to a spread code is significantly smaller than the level of an interfering spread spectrum signal related to another spread code.

As shown in FIG. 6, the burst generating circuit 100 includes pairs of upper and lower shift registers SR1a, SR1b, . . . SR20a, and SR20b. The input transmission data sequences D1, D2, . . . , and D20 can be applied to the shift registers SR1a, SR1b, . . . , SR20a, and SR20b via a switching network SWA and switches SWB1. SWB2, . . . , and SWB20. Each of the shift registers SR1a, SR1b, . . . , SR20a, and SR20b has a cascade combination of segments, the number of which corresponds to a given 1-burst length. The shift registers SR1a, SR1b, ..., SR20a, and SR20b are connected to the P/S converter 200 via switches SWC1, SWC2, . . . , and SWC20.

An example of operation of the burst generating circuit 100 will be described hereinafter. During a first period, the input transmission data sequences D1, D2, . . . , and D20 are written into the upper shift registers SR1a, SR2a, . . . , and SR20a respectively via the switching network SWA and the switches SWB1, SWB2, . . . , and SWB20, and data are read out from the lower shift resisters SR1b, SR2b, . . . , and SR20b and are fed to the P/S converter 200 via the switches SWC1, SWC2, . . . , and SWC20 as the burst data B1, B2, . . . , B20 respectively. During a second period, the input transmission data sequences D1, D2, . . . , and D20 are written into the lower shift registers SR1b, SR2b, . . . , and SR20b respectively via the switching network SWA and the switches SWB1, SWB2, . . . , and SWB20, and data are read out from the upper shift registers SR1a, SR2a, . . . , and SR20a and are fed to the P/S converter 200 via the switches SWC1, SWC2, . . . , and SWC20 as the burst data B1, B2, . . . , B20 respectively. The operation in the first period and the operation in the second period are alternately reiterated. The switching network SWA, the switches SWB1, SWB2, ..., and SWB20, and the switches SWC1, SWC2, . . . , and SWC20 are controlled by timing signals fed from the controller 800.

Another example of operation of the burst generating circuit 100 will be described hereinafter. In the case where the number of input transmission data sequences is smaller than 20 and one input transmission data sequence D1 is required to be assigned to two burst data B1 and B2, during a first period, the input transmission data sequence D1 is successively written into the upper shift registers SR1a and SR2a via the switching network SWA and the switches SWB1 and SWB2 while data are simultaneously read out from the lower shift registers SR1b and SR2b and are fed to the P/S converter 200 via the switches SWC1 and SWC2 as the burst data B1 and B2. During a second period, the input transmission data sequence D1 is successively written into the lower shift registers SR1b and SR2b via the switching network SWA and the switches SWB1 and SWB2 while data are simultaneously read out from the upper shift registers SR1a and SR2a and are fed to the P/S converter 200 via the switches SWC1 and SWC2 as the burst data B1 and B2. The operation in the first period and the operation in the second period are alternately reiterated. The switching network SWA, the switches SWB1 and SWB2, and the switches SWC1 anti SWC2 are controlled by timing signals fed from the controller 800.

The controller 800 will be further described hereinafter. The input data information fed to the controller 800 represents the number of input transmission data sequences, the transmission rates of the respective input transmission data sequences, and the priority order among the input-transmission data sequences. The controller 800 controls the burst generating circuit 100, and specifically the switching network SWA, the switches SWB1, SWB2, . . . , and SWB20, and the switches SWC1, SWC2, . . . , and SWC20 in response to the number of input transmission data sequences, the transmission rates of the respective input transmission data sequences, and the priority order among the input transmission data sequences which are represented by the input data information. In the case of a predetermined basic transmission rate (for example, 9.6 kbps), the controller 800 controls the burst generating circuit 100 so that each input transmission data sequence will be assigned to one burst data. In the case where a transmission rate higher than the basic transmission rate is required and the number of input transmission data sequences is smaller than the maximum number (for example, 20) of burst data, the controller 800 controls the burst generating circuit 100 so that each input transmission data sequence will be assigned to a plurality of burst data. In the case where-the number of input transmission data sequences is equal to the maximum number (for example, 20) of burst data, the controller 800 controls the burst generating circuit 100 so that the burst allocation will be determined by the priority order.

As previously described, according to the embodiment of this invention, a plurality of data sequences are transmitted by using one carrier and different spread code patterns, and the data sequences related to a same spread code pattern are time-division-multiplexed so that an increased number of communication channels can be provided. In addition, by changing the number of used time slots with respect to mobile stations, it is possible to vary the data rates of communication channels.

The necessary number of different spread codes is smaller than that in a prior art design for equal channel numbers. The quality of a received signal related to a spread code pattern is prevented from being lowered by an interfering signal related to another spread code pattern. Specifically, the provision of the reserve time slot enables the removal of a reduction of a reception quality of a desired signal.

What is claimed is:

1. A mobile communication
    means for providing groups each having a plurality of communication channels;
    means for generating signals to be transmitted via the respective communication channels in the groups;
    means for time-division-multiplexing the transmitted signals into a data sequence for each of the groups;
    means for spectrum-spreading the data sequences in response to different spread code patterns respectively;
    means for providing a reserve time slot;
    means for detecting a reduction of a received signal quality related to each of the communication channels; and means for, in cases where a reduction of a received signal quality related to one of the communication channels is detected, using the reserve time slot in transmitting the signal of said one of the communication channels.

2. A mobile communication system comprising:

a burst generating circuit for generating burst data in parallel in response to input data;

a parallel-to-serial converter unit, coupled to the output of the burst generating circuit, for receiving the burst data and converting the burst data into a plurality of serial burst data streams, said parallel-to-serial converter unit including a plurality of segments corresponding to the plurality of serial burst data streams, wherein each segment includes a plurality of registers corresponding to time slots and a parallel-to-serial converter element coupled to the output of the registers, wherein the time slots include at least one reserve time slot and a plurality of general time slots;

a plurality of spread spectrum circuits respectively coupled to outputs of the plurality of segments of the parallel-to-serial converter unit, wherein a different spread code pattern is applied to each of the spread spectrum circuits;

output means coupled to outputs of the spread spectrum circuits and for generating a time-division-multiplexed output signal comprising a plurality of communication channels, wherein the communication channels are assigned to the general time slots and burst data to transmitted over the communication channels is loaded into the registers corresponding to the general time slots assigned to the communication channels;

monitoring circuit means for detecting a communication channel having a reduced reception signal quality from the plurality of communication channels and generating an output signal indicative thereof; and control means responsive to the output signal generated by the monitoring circuit means for controlling the operation of the burst reassign the communication channel having the reduced reception signal quality to a reserve time slot, wherein burst data to be transmitted over the communication channel having the reduced reception signal quality is then loaded into the register corresponding to the reserve time slot.

* * * * *